United States Patent [19]
Miekley et al.

[11] Patent Number: 5,818,225
[45] Date of Patent: Oct. 6, 1998

[54] SENSOR APPARATUS INCLUDING COMPENSATING CIRCUIT FOR TEMPERATURE EFFECTS

[75] Inventors: Klaus Miekley; Erich Rubel, both of Ludwigsburg; Ralf Noltemeyer, Wernau, all of Germany

[73] Assignee: Robert Bosch GmbH, Stuttgart, Germany

[21] Appl. No.: 758,463

[22] Filed: Dec. 2, 1996

[30] Foreign Application Priority Data

Dec. 1, 1995 [DE] Germany .................. 195 44 863.4

[51] Int. Cl.⁶ .......................... G01R 33/07; H01L 43/06
[52] U.S. Cl. .................. 324/251; 324/225; 338/32 H
[58] Field of Search .................. 324/251, 225, 324/235; 338/32 H; 327/511, 513

[56] References Cited

U.S. PATENT DOCUMENTS 5,550,469  8/1996  Tanabe et al. ................ 324/251

FOREIGN PATENT DOCUMENTS 0071962   2/1983  European Pat. Off. .
0129817A1 1/1985  European Pat. Off. .
0273103B1 7/1988  European Pat. Off. .

*Primary Examiner*—Walter E. Snow
*Attorney, Agent, or Firm*—Michael Striker

[57] ABSTRACT

The sensor apparatus includes a sensor device having a control current ($I_H$) flowing through it, a sensitivity and a temperature dependence of the control current characterized by a temperature coefficient, and a temperature compensating circuit for compensating temperature changes adversely effecting the sensitivity of the sensor device. The temperature compensating circuit includes a circuit portion which sets or adjusts the temperature coefficient of the control current($I_H$) according to changes in the temperature dependent internal resistance of the sensor device so that changes in negative temperature coefficients of other physical quantities determining the sensor sensitivity are compensated.

7 Claims, 2 Drawing Sheets

SENSOR APPARATUS INCLUDING COMPENSATING CIRCUIT FOR TEMPERATURE EFFECTS

BACKGROUND OF THE INVENTION

The present invention relates to a sensor apparatus with a sensor device through which a control current flows, whose internal resistance has a temperature coefficient, and to electrical circuitry connected to the sensor device which includes a temperature compensating circuit, with which the temperature effects adversely effecting the sensitivity of the sensor device are compensated.

A sensor apparatus of this type is described as known in European Patent Application EP 0 273 103 B1. In this apparatus adjustment of the temperature dependence of the offset and sensitivity are advantageously separately provided, so that the circuitry can be adjusted in a simple way. The compensation of the temperature dependence of the sensitivity occurs by means of a temperature dependent resistance in a network of resistors of oppositely coupled branches of a first differential amplifier and with a temperature dependent voltage divider, to which the noninverting input of a second differential amplifier is connected. Because of that, an exact compensation of the temperature dependence is difficult.

In European Patent Application EP 129 817 B1 another sensor apparatus is described with a compensating circuit for adverse temperature effects, in which a constant voltage component and a variable voltage component varying with the temperature of the electrical system of a Hall generator are added to form a resulting voltage, which is fed to a noninverting input of an operational amplifier whose inverting input is connected with an output signal voltage contact of a Hall generator and whose output is connected with the output-side control voltage terminal of the Hall generator. The compensation performed in this way does not distinguish between the temperature dependence of the sensitivity and the offset.

SUMMARY OF THE INVENTION

It is an object of the present invention to provide an improved sensor apparatus of the type described above having temperature compensating means, which guarantees an exact and independent compensation of the temperature dependence of the sensitivity with comparatively reduced expense.

These objects, and others which will be made more apparent hereinafter, are attained in a sensor apparatus including a sensor device through which a control current flows, whose internal resistance has a temperature coefficient, and an electrical circuit including temperature compensating means for compensating temperature effects adversely effecting the sensitivity of the sensor device.

According to the invention, the temperature compensating means includes means for setting or adjusting the temperature coefficient of the control current according to changes in the internal resistance of the sensor device so that changes in negative temperature coefficients of other physical quantities determining the sensitivity are compensated.

Because of that, an exact compensation of the temperature dependence of the sensitivity is continuously obtained which is itself derived from the temperature sensitivity of the sensor device and thus is an exact result of it. Also additional temperature sensing elements are avoided, because of this feature so that circuitry expenses are less.

The sensor apparatus is advantageously designed so that the positive temperature coefficient of the control current set by the compensating circuitry corresponds to the magnitude of the sum of the negative temperature coefficients of the other physical quantities. For example, in a Hall sensor the output voltage $U_H = k \times I_H \times B$, wherein the variable k, $I_H$ and B have at times negative temperature coefficients. When the temperature coefficient of the control current $I_H$ is made positive and corresponds to the magnitude of the sum of the negative temperature coefficients of the quantities k and B, a practically complete temperature compensation of the sensitivity of the sensor device is obtained, because the product in the vicinity of 1 corresponds in good approximation to the sum.

A simple embodiment of the sensor apparatus according to the invention results when the desired temperature dependence of the control current provided with the positive temperature coefficient is combined from a temperature independent component or part of a voltage divider and a temperature varying component or part of the sensor device.

In a preferred embodiment of the sensor apparatus according to the invention the compensating circuit has a differential amplifier having an inverting input to which a biasing voltage is applied and a feedback branch with a feedback resistor connected to the input of the sensor device and the inverting input. The noninverting input of the differential amplifier is connected with the control-side output of the sensor device, which is grounded via a current sensing resistor. The output of the differential amplifier is connected with a control element for the control current. A control loop is formed with this compensating circuit, with which the desired control current is exactly continuously maintained. Advantageously the control element is a PNP-transistor and that the output of the differential amplifier is connected by a resistor with the base of the PNP transistor. The power supply voltage is applied to the emitter of the transistor and its collector is connected to the input of the sensor device.

Moreover in an additional embodiment of the invention the biasing voltage is tapped between two resistors of a voltage divider to which the power supply voltage is applied and the temperature coefficient of the control current is set by suitable selection of the feedback branch resistor resistance and a resistance of a resistor in the voltage divider connected to the positive potential of the supply voltage. By suitable selection of the voltage divider resistance KR and of the feedback coupling branch resistance LR the desired predetermined temperature coefficient for the control current may be easily obtained.

An additional temperature influence on the output signal of the sensor is compensatable by expanding the compensating circuit by including an additional circuit portion by which the temperature dependence of the offset is compensatable. This circuit portion is advantageously formed so that it has two resistors M and τM connected in series with each other, of which the one is connected to the input of the sensor device and the other is connected to its control-side output. A connection to a common connection point between both of the resistors connected in series with each other and an inverting input of an additional differential amplifier is made. The output signal is applied across the inverting and noninverting input terminals of the additional differential amplifier for amplification. The fact that the temperature dependence of the offset signal corresponds to the temperature coefficient of the internal resistance of the Hall element is utilized here. The temperature dependence of the offset signal is eliminated by suitable selection or dimensioning of M, τM and Q.

The sensor device, for example, comprises a Hall sensor element.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
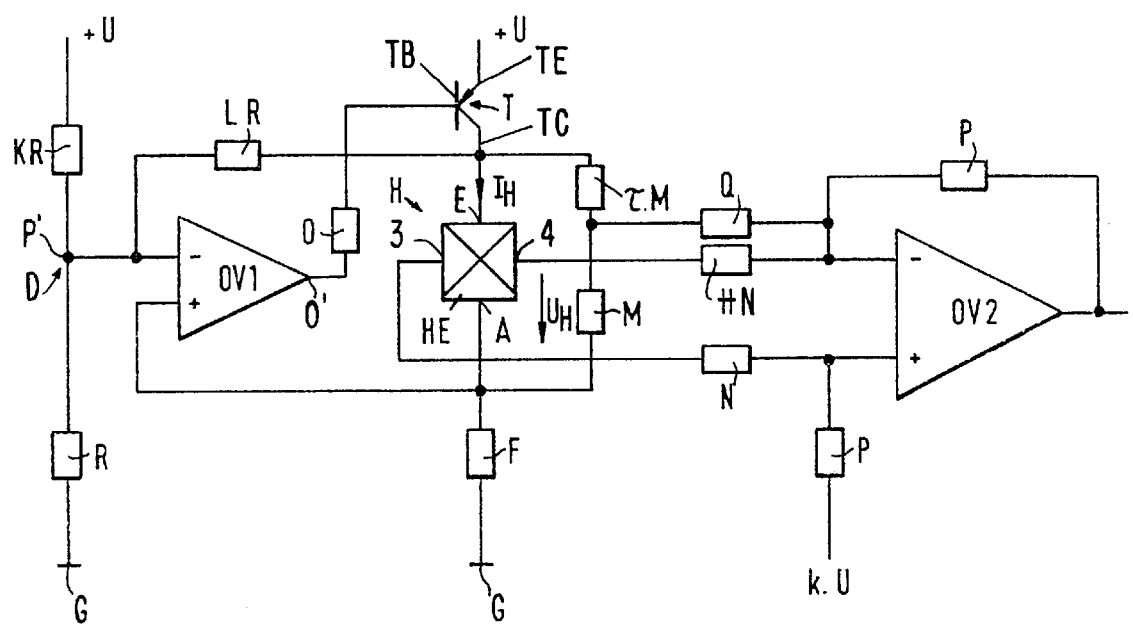
FIG. 1 is a circuit diagram of a sensor apparatus in which a sensor element HE of a sensor device H is connected in an electrical circuit.

The electrical circuit shown in FIG. 1 includes a temperature compensating circuit for sensitivity connected to the control-side input E and the control-side output A of the sensor element HE, a similar circuit portion for compensation of the temperature dependence of the offset signal connected to the control-side input E and the control-side output A and an amplifier circuit portion connected across the output terminals of the Hall sensor element HE.

The compensation circuit for the temperature dependence of the sensitivity includes the differential amplifier OV1. The noninverting input+of the differential amplifier OV1 is connected to the control-side output A of the Hall sensor element HE. The inverting input−of the differential amplifier OV1 is connected by a feedback branch including a feedback resistor LR to the control-side input E of the Hall sensor element HE and to a connection point P' between two resistors KR and R connected in series in a voltage divider D. The power supply voltage +U is applied to the end of the resistor KR not directly connected to the resistor R in the voltage divider D. The end of the resistor R not connected to the resistor KR in the voltage divider D is connected to ground G. The output O' of the differential amplifier OV1 is connected via resistor O to the base TB of a PNP transistor T, whose emitter TE is connected to the supply voltage +U and whose collector TC is connected to the input E of the Hall sensor element HE. The control-side output A of the Hall sensor element HE is connected to ground G via a current sensing resistor F. In this way a control or feedback loop is formed for the control current $I_H$ in which the PNP transistor T acts as current controlling means. The set-value temperature dependence of the control current $I_H$ is formed by combining a temperature independent part from the voltage divider D including resistors KR,R and a temperature varying part from the sensor H.

With the temperature compensating circuit described here the control current $I_H$ is adjusted to maintain a positive temperature coefficient. This adjusting is allowed by selection of the resistance values of resistors KR and LR in the desired way to compensate the negative temperature coefficients of the other physical quantities influencing the output signal $U_H$ of the sensor device H. The positive temperature coefficient of the control current $I_H$ results from the fact that the internal resistance of the Hall sensor element HE has a comparatively large positive temperature coefficient in comparison to the other physical quantities.

Because of that, the positive temperature coefficient of the control current may be set to a value which corresponds to the magnitude of the sum of the negative temperature coefficients of the other physical quantities.

In the known equation for the sensor output signal $U_H$ of the Hall sensor element, $U_H = k \times I_H \times B$, the temperature coefficient of the control current $I_H$ is adjustable to a positive value, which corresponds to the magnitude of the sum of the negative temperature coefficients of k and B (which are examples of the other physical quantities), so that the temperature dependence of the output signal $U_H$ is practically or approximately almost completely compensated or balanced out. This is connected with the fact that the product changed by the temperature in the vicinity of 1 corresponds in good approximation to the sum changed by the temperature.

For amplification of the output signal $U_H$ the output terminal 3 of the Hall sensor element HE is connected by a resistor N with the inverting input−of an additional differential amplifier OV2 and the other output terminal 4 is connected by a resistor N with the noninverting input+of the additional differential amplifier OV2. The output of the additional differential amplifier OV2 is fedback to the inverting input−of it through a resistor P, while the noninverting input+of this other differential amplifier is connected to a source of a potential K×U via another resistor P.

Thus the temperature dependence of the sensitivity may be compensated with the compensating circuit according to the invention described here, whereby the temperature dependent changes of the internal resistance of the Hall sensor element HE are utilized and thus the use of additional temperature-dependent resistors is eliminated. In the compensation circuit described here the temperature coefficient of the resistance of the Hall sensor element is larger than the temperature coefficient of the control current $I_H$ required for compensation of the temperature coefficients of the other physical quantities k, B.

The Hall sensor element HE can, for example, be part of an acceleration sensor or the like, in which a change of magnetic induction results due to the variable to be detected, which for its part determines the output signal $U_H$.

Figure 2:
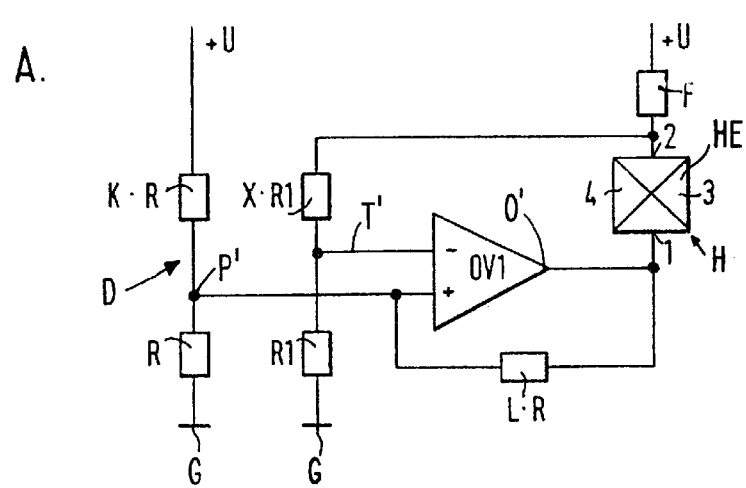
FIGS. 2A, B and C are circuit diagrams of other embodiments of the sensor apparatus without the connected amplifier circuit portion.
Figure 2:
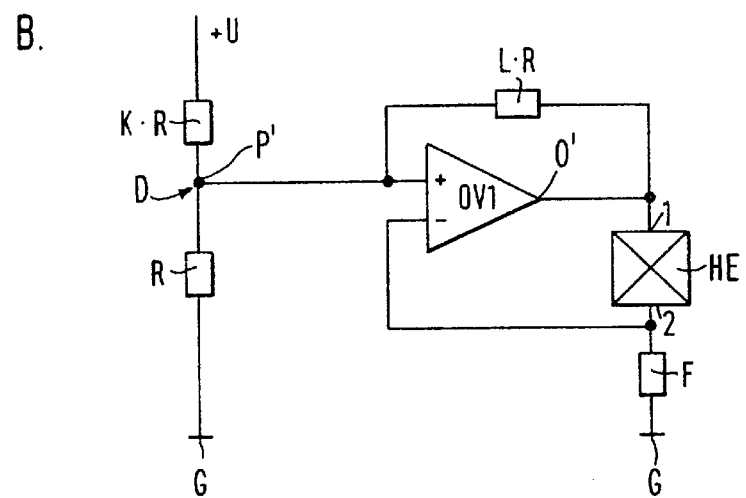
Figure 2:
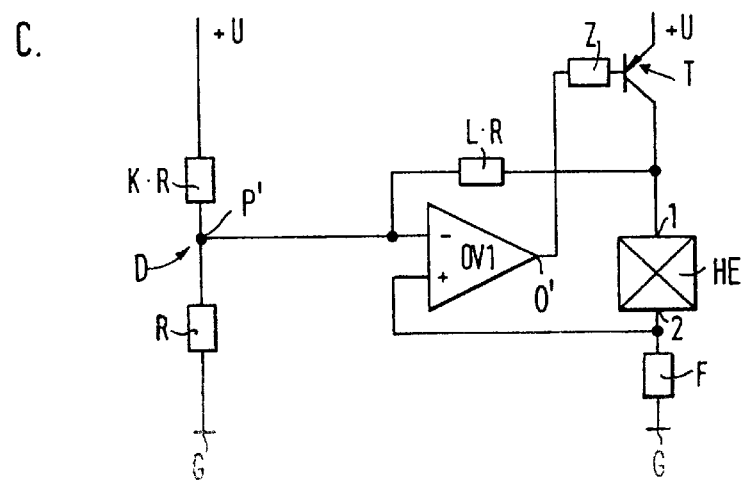

In FIGS. 2A, 2B and 2C three other circuit examples A, B and C of temperature compensating means are shown, which show how the sensor device H is connected in the electrical circuit arrangement. The embodiment in FIG. 2A corresponds in some ways to the example in FIG. 1, except that the following amplifier circuit means is not shown. The circuit components in FIGS. 2A, 2B and 2C which are the same as in FIG. 1 are provided with the same reference characters as in FIG. 1, however the control-side output and the input of the Hall sensor HE are indicated with 1 and 2 respectively.

The circuits shown in FIGS. 2A, 2B and 2C are built-in to known constant current generating circuits and include a temperature-dependent voltage divider D with resistors R and KR connected in series between the supply voltage +U and ground G. The noninverting input+of operational amplifier OV1 is connected to a connection point P' between the resistors R and KR of the voltage divider D in the case of examples A and B. The output O' of the operational amplifier OV1 is electrically connected to the input 1 of the sensor device H, which should be supplied with a constant current. The control-side output terminal 2 of the sensor device H is connected with the positive supply voltage +U via the resistor F in the case of example A. For level control of the operational amplifier OV1 an additional voltage divider consisting of the resistors R1 and XR1 connected in series is provided in example A. A tap T' between the two resistors R1,XR1 connects to the inverting input−of the operational amplifier OV1. The resistor XR1 is connected to a common point between the control-side output 2 of the sensor device H and the current sensing resistor F and the resistor R1 is connected directly to ground G. The component and/or the sensor device H has a—here positive—temperature coefficient such that the output voltage of the operational amplifier OV1 is temperature dependent at constant current flow. When a resistor LR is included in this circuit as in example B between the noninverting input+of the operational amplifier OV1 and its output, the voltage at the noninverting input+of the operational amplifier OV1 is a combination of a temperature independent part from the voltage divider D and the temperature dependent part from another voltage divider consisting of R and LR. By suitable selection of the resistances of the resistors R, KR and LR the temperature coefficient may be adjusted to a value between zero and that of the resistance of the sensor device H.

The sensor device H, for example, is a Hall element HE with a positive temperature coefficient (TK). The conversion factor of the sensor H for converting the magnetic field B into an electrical output signal has a negative temperature dependence. An approximately temperature independent electrical signal characteristic of the converted magnetic field at the Hall element may be obtained by a suitable adjustment and/or selection of the value of the temperature coefficient of the control current. This adjustment, selection or dimensioning of the temperature coefficient may be accomplished especially by selection of the resistance values for the resistors R, KR and LR.

The same result may be obtained with the "mirror" circuit according to example D. The same goes for the circuit of example C. The use of an additional transistor T as in FIG. 1 may be significant with the limited controllability of the operational amplifier allowed at comparatively small supply voltages. Also the reversal of the control signal in comparison to that of example A should be noted.

In accordance with the circuit shown in FIG. 1 another differential amplifier may be connected to the terminals 3 and 4 of the Hall sensor. The amplified output voltage is available then at the output of this other differential amplifier. The connection of this type of amplifier is possible in each of the examples A, B and C with suitable adjustments.

The circuit shown in FIG. 1 also includes a portion for compensation of the temperature dependence of the offset which includes an additional circuit branch consisting of the resistor M and the resistor τM connected in series with each other. This additional circuit branch is connected across the input E of the sensor device H and the output A of the sensor device. A resistor Q is connected to the inverting input–of the additional operational amplifier OV2 in the amplifier portion and a common connection point between the resistor M and the resistor τM.

The disclosure in German Patent Application 1 95 44 863.4-35 of Dec. 1, 1995, which describes the present invention and upon which a claim of priority is based, of Dec. 1, 1995 is incorporated here by reference.

While the invention has been illustrated and described as embodied in a sensor apparatus including compensating circuit for temperature effects, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A sensor apparatus comprising a sensor device (H), said sensor device (H) having an input(E), a control-side output (A), a control current ($I_H$) which flows through said sensor device and a temperature dependent internal resistance as well as a sensitivity and a temperature dependence of the control current ($I_H$) characterized by a temperature coefficient; and an electrical circuit connected to said sensor device (H) including a temperature compensating means for compensating temperature changes adversely effecting the sensitivity of the sensor device;

wherein said temperature compensating means includes a differential amplifier (OV1) having a noninverting input(+), an inverting input(−) and an output (O'), the noninverting input (+) of the differential amplifier (OV1) being connected with the control-side output (A) of the sensor device (H); a feedback circuit branch comprising a feedback resistor (LR) connected between the input (E) of the sensor device(H) and the inverting input (−) of the differential amplifier (OV1); means for supplying a biasing voltage connected electrically to the inverting input (−) of the differential amplifier (OVl); a current sensing resistor (F) connected between the output (A) of the sensor device (H) and ground (G) and a current controlling means (T) for controlling the control current ($I_H$) connected electrically with the output (O') of the differential amplifier (OV1).

2. The sensor apparatus according to claim 1, wherein said current controlling means (T) comprises a PNP transistor having a base (TB), a collector (TC) and an emitter (TE), and the output (O') of the differential amplifier (OV1) is connected to the base (TB) of the PNP transistor via a resistor (O), a supply voltage (+U) is applied to the emitter (TE) of the PNP transistor and the collector (TC) is connected to the input (E) of the sensor device (H).

3. The sensor apparatus according to claim 2 wherein the means for supplying the biasing voltage comprises a voltage divider (D) consisting of two resistors (KR,K) connected in series with each other and an electrical connection between the inverting input (−) of the differential amplifier (OV1) and a common connection point (P') between the two resistors (KR,K) and the temperature coefficient of the control current ($I_H$) is adjusted and set by selection of resistance values for the feedback resistor (LR) and one (KR) of the two resistors of the voltage divider (D) to which the supply voltage (+U) is applied.

4. The sensor apparatus according to claim 1, wherein the sensor device (H) comprises a Hall sensor element (HE).

5. A sensor apparatus comprising a sensor device (H), said sensor device (H) having an input (E), a control-side output (A), a control current ($I_H$) which flows through said sensor device and a temperature dependent internal resistance as well as a sensitivity and a temperature dependence of the control current ($I_H$) characterized by a temperature coefficient; and an electrical circuit connected to said sensor device (H) including a temperature compensating means for compensating temperature changes adversely effecting the sensitivity of the sensor device;

wherein said temperature compensating means includes a differential amplifier (OV1) having a noninverting input(+), an inverting input (−) and an output (O'), the inverting input (−) of the differential amplifier (OV1) being connected with the control-side output (A) of the sensor device (H); a feedback circuit branch comprising a feedback resistor (LR) connected between the input (E) of the sensor device (H) and the noninverting input (+) of the differential amplifier (OV1); means for supplying a biasing voltage connected electrically to the noninverting input (+) of the differential amplifier (OVI) and a current sensing resistor (F) connected between the output (A) of the sensor device (H) and ground (G).

6. The sensor apparatus according to claim 5, wherein the means for supplying the biasing voltage comprises a voltage divider (D) consisting of two resistors (KR,K) connected in series with each other and an electrical connection between the noninverting input (+) of the differential amplifier (OV1) and a common connection point (P') between the two resistors (KR,K), and the temperature coefficient of the control current ($I_H$) is adjusted and set by selection of resistance values for the feedback resistor (LR) and one of the two resistors of the voltage divider (D) to which the supply voltage (+U) is applied.

7. The sensor apparatus as defined in claim 6, wherein the inverting input (−) of the differential amplifier (OV1) is connected with the control-side output (A) of the sensor device (H) via a first additional divider resistor (XR1) and a tap (T) connected between said first additional divider resistor (XR1) and the inverting input (−) is grounded via a second additional divider resistor (R1) in order to provide an additional voltage divider for level control of the differential amplifier.

* * * * *